(12) United States Patent
Hoisington et al.

(10) Patent No.: US 7,896,258 B2
(45) Date of Patent: Mar. 1, 2011

(54) SPEED BASED FLUID CONTROL FOR DUST REDUCTION IN THE MINING INDUSTRY HAVING GUI USER-INTERFACE

(76) Inventors: Charles Hoisington, Safford, AZ (US); Garrett C. Hoesington, Winnemucca, NV (US); Chad Rolfe, Phoenix, AZ (US)

( * ) Notice: Subject to any disclaimer, the term of this patent is extended or adjusted under 35 U.S.C. 154(b) by 447 days.

(21) Appl. No.: 12/074,881

(22) Filed: Mar. 7, 2008

(65) Prior Publication Data

US 2009/0224084 A1 Sep. 10, 2009

(51) Int. Cl.
 *B05B 9/06* (2006.01)
(52) U.S. Cl. ...................................... 239/155
(58) Field of Classification Search ......... 239/155–157, 239/159, 146, 67–70; 169/64
 See application file for complete search history.

(56) References Cited

U.S. PATENT DOCUMENTS

| | | | |
|---|---|---|---|
| 3,587,971 A * | 6/1971 | Ross ........................ | 239/155 |
| 4,274,585 A * | 6/1981 | Lestradet ................... | 239/124 |
| 4,315,317 A | 2/1982 | Orchard et al. | |
| 4,593,360 A | 6/1986 | Cocks | |
| 4,650,124 A * | 3/1987 | Connaughty et al. ........ | 239/708 |
| 5,004,155 A * | 4/1991 | Dashevsky ................. | 239/127 |
| 5,433,380 A * | 7/1995 | Hahn .......................... | 239/62 |
| 5,475,614 A | 12/1995 | Tofte et al. | |
| 6,749,128 B1 | 6/2004 | Oosterman | |
| 6,977,013 B2 * | 12/2005 | Schroeder et al. ........... | 118/679 |
| 7,213,772 B2 | 5/2007 | Bryan et al. | |
| 2007/0221744 A1 * | 9/2007 | Simon et al. .................. | 239/67 |

* cited by examiner

*Primary Examiner*—Davis Hwu
(74) *Attorney, Agent, or Firm*—Thrasher Associates

(57) ABSTRACT

A system and apparatus for controlling the delivery of fluid from a reservoir, in relation to the ground speed of the vehicle delivering the fluid. Including a system where a hydraulic pump and motor are the components to drive the delivery of the fluid from the reservoir. The hydraulic motor is controlled to vary the output of the fluid pump based on a programmable logic controller (PLC) program. Where an operator selects the desired density of fluid to be pumped, the PLC controls fluid pump flow by controlling the hydraulic motor speed based on the vehicle ground speed.

7 Claims, 11 Drawing Sheets

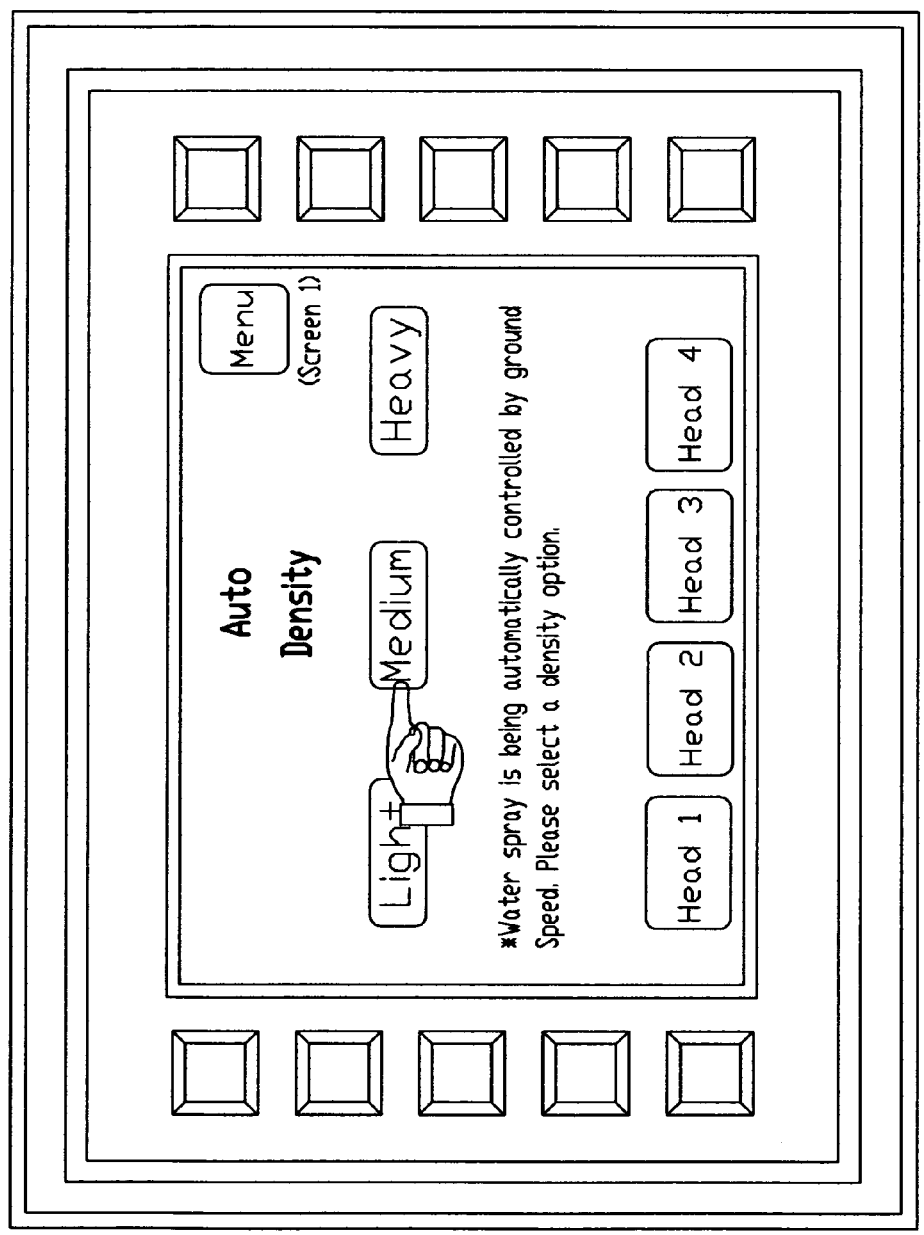

SPEED BASED FLUID CONTROL FOR DUST REDUCTION IN THE MINING INDUSTRY HAVING GUI USER-INTERFACE

TECHNICAL FIELD

The present invention relates to fluid control and, more specifically, a system and apparatus for controlling the delivery of a fluid to a surface.

BACKGROUND OF THE INVENTION

Problems involved in maintaining a consistent density of sprayed liquid from a vehicle have long been recognized. For example, in a vehicular sprayer of the type having a number of spray heads and a pump for pumping liquid to the spray heads, it has been the practice to manually preset either the pump speed or the spray head pressure for a particular vehicle speed for operation only at that particular speed. However, it is not convenient or even possible to maintain a precise vehicular speed during spraying.

There are numerous applications in which it is necessary to continuously control the dissemination of a fluid from a reservoir, through control of the fluid pump motor speed. There are, for example, numerous agricultural and contracting operations in which tank trucks are used to selectively spray a liquid along particular paths where the liquid may produce some beneficial results. Other vehicles, for, example, crop dusting planes and fire fighting planes, need an accurate system for control of fluid flow to insure effectiveness and avoid waste. In existing systems the fluid being applied is controlled by manual operation of on/off switches and a timer device (for intermittent application). In these controls, the speed of the water pump is determined by the rpm of the delivery vehicle's engine.

Selective control of the flow rate is often necessary to meet certain environmental concerns, minimize wastage of fluid, or to minimize the time required to carry out the operation of applying the fluid. It is desirable that the flow rate be easily controllable by a single operator from a central location, as in the cab of the spray vehicle. It is also desirable to control the flow evenly in relation to ground speed regardless of change in speed or change in engine rpm of the vehicle that is applying the fluid. It is further advantageous to be able to easily change the dispensing rate after an initial setup of the control system. In addition, it is desirable to have automatically controlled intermittent application option for dispensing fluid at intervals determined by user input.

SUMMARY

Accordingly, in one aspect, a system and apparatus is provided for applying a fluid from a vehicle to a surface.

In another aspect, a system and apparatus is provided which are adapted to automatically provide fluid flow adjustments in relation to vehicle speed and/or distance traveled.

In another aspect, a system and apparatus is provided including a vehicle, multiple fluid applicators mounted thereto and a fluid conduit supplying fluid to said applicators from a reservoir, the system and apparatus for applying a fluid to road surfaces used in open pit mining sites, as required by the Environmental Protection Agency, the system and apparatus comprising a hydraulic pump driven by the engine of the vehicle, a hydraulic motor driven by the flow of hydraulic fluid provided thereto (wherein the speed of the motor is proportional to the flow of the applied hydraulic fluid), a hydraulic value coupled between the hydraulic pump and the hydraulic motor for controlling the flow of hydraulic fluid to the hydraulic motor, a fluid application pump driven by the hydraulic motor and for providing the fluid to be applied to the road surface to the fluid applicators, wherein an amount of application fluid pumped by the fluid application pump is proportional to the speed of the hydraulic motor, a speed sensor for detecting the speed of the vehicle and for generating a signal indicative of the detected speed, and a control apparatus having a control coupling to the hydraulic value and the multiple fluid applicators for controlling the application of the fluid to the road surface. The control apparatus comprising a programmable logic controller having an input for receiving the detected speed signal, and responsive thereto controlling the speed of the hydraulic motor via the flow from the hydraulic valve for enabling a controlled amount of application fluid to be provided to the multiple fluid applicators in relation to the detected vehicle speed, and a touch screen graphical user interface in communication with the logic controller for enabling a user to select from a plurality of programmed responses provided by the logic controller, wherein each one of the selections enables a different controlled amount of application fluid to be applied to the road surface.

In another aspect, a system and apparatus is provided for applying a sprayed fluid from a delivery vehicle to a surface, comprising a fluid pump for providing the fluid to a plurality of spray heads (where the fluid is stored in a reservoir and provides the fluid to the fluid pump), a motor connected to the fluid pump for driving the fluid pump (where an amount of fluid pumped by the fluid pump is proportional to the speed of the motor), a speed sensor for detecting the speed of the delivery vehicle and for generating a signal indicative of the detected speed, and a control apparatus having a control coupling to the motor and the spray heads. The control apparatus comprising a programmable logic controller having an input for receiving the detected speed signal, and responsive thereto for controlling the speed of the motor and on/off operation of the spray heads for enabling a controlled amount of fluid to be applied to a delivery surface in relation to the detected vehicle speed, and a touch screen graphical user interface in communication with the logic controller for enabling an user to select from a plurality of programmed responses provided by the logic controller, wherein each one of the selections enables a different controlled amount of fluid to be applied to the delivery surface.

In another aspect, the present invention provides a fluid application control apparatus for integration with a delivery vehicle and for controlling the application of a fluid to road surfaces used in open pit mining sites as required by the Environmental Protection Agency, the apparatus comprising a programmable logic controller having an input for receiving a signal indicative of a detected speed of the vehicle, and responsive thereto controlling the amount of fluid discharged in relation to the vehicle speed (where the fluid amount is determined by the speed of a fluid pump which is determined by the speed of a hydraulic motor driving the fluid pump, and where the speed of the hydraulic motor is determined by a flow of hydraulic fluid provided to the hydraulic motor), the programmable logic controller controls a valve from which hydraulic fluid is provided to the hydraulic motor, and a touch screen graphical user interface in communication with the logic controller for enabling a user to select from a plurality of programmed responses provided by the logic controller, where each one of the selections enables a different controlled amount of fluid to be applied to the road surface.

DETAILED DESCRIPTION

Figure 1:
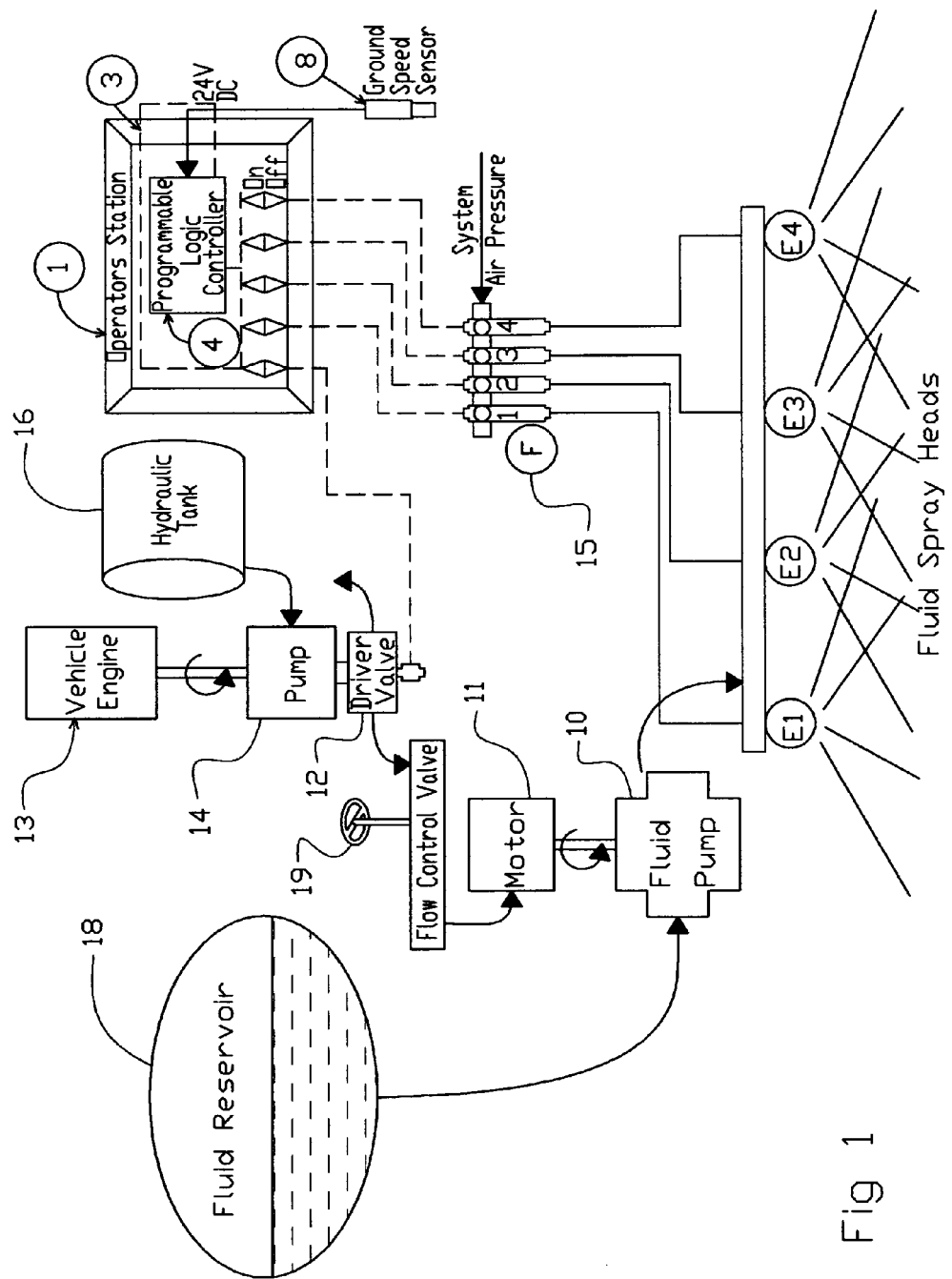
FIG. 1 illustrates a schematic of a system in accordance with an embodiment of the present invention.

Referring to FIG. 1, there is shown a schematic of a system in accordance with an embodiment of the present invention. The FIG. 1 is a schematic of a system utilizing a PLC 4 to control application of a fluid and which can be integrated with a vehicle. A PLC as an advantage over other computing devices because PLCs are better armored for severe conditions (dust, moisture, heat, cold, etc., as is the type of conditions seen in the open pit mining industry) and have the facility for extensive input/output (I/O) arrangements. These are used to connect the PLC 4 to sensors and actuators to perform the functions presently described. On the actuator side, the PLC 4 can operate electric motors, pneumatic or hydraulic cylinders, magnetic relays or solenoids, or analog outputs. The PLC 4 contains input and output devices compatible with industrial pilot devices and controls; little electrical design is required, and the design problem centers on expressing the desired sequence of operations in ladder logic (or function chart) notation. Programs for the PLC 4 can be written in a special application on a personal computer, then downloaded by a direct-connection cable (not shown) or over a network (such as a wireless network) to the PLC 4. The program can be stored in the PLC 4 either in battery-backed-up RAM or some other non-volatile flash memory.

Figure 4:
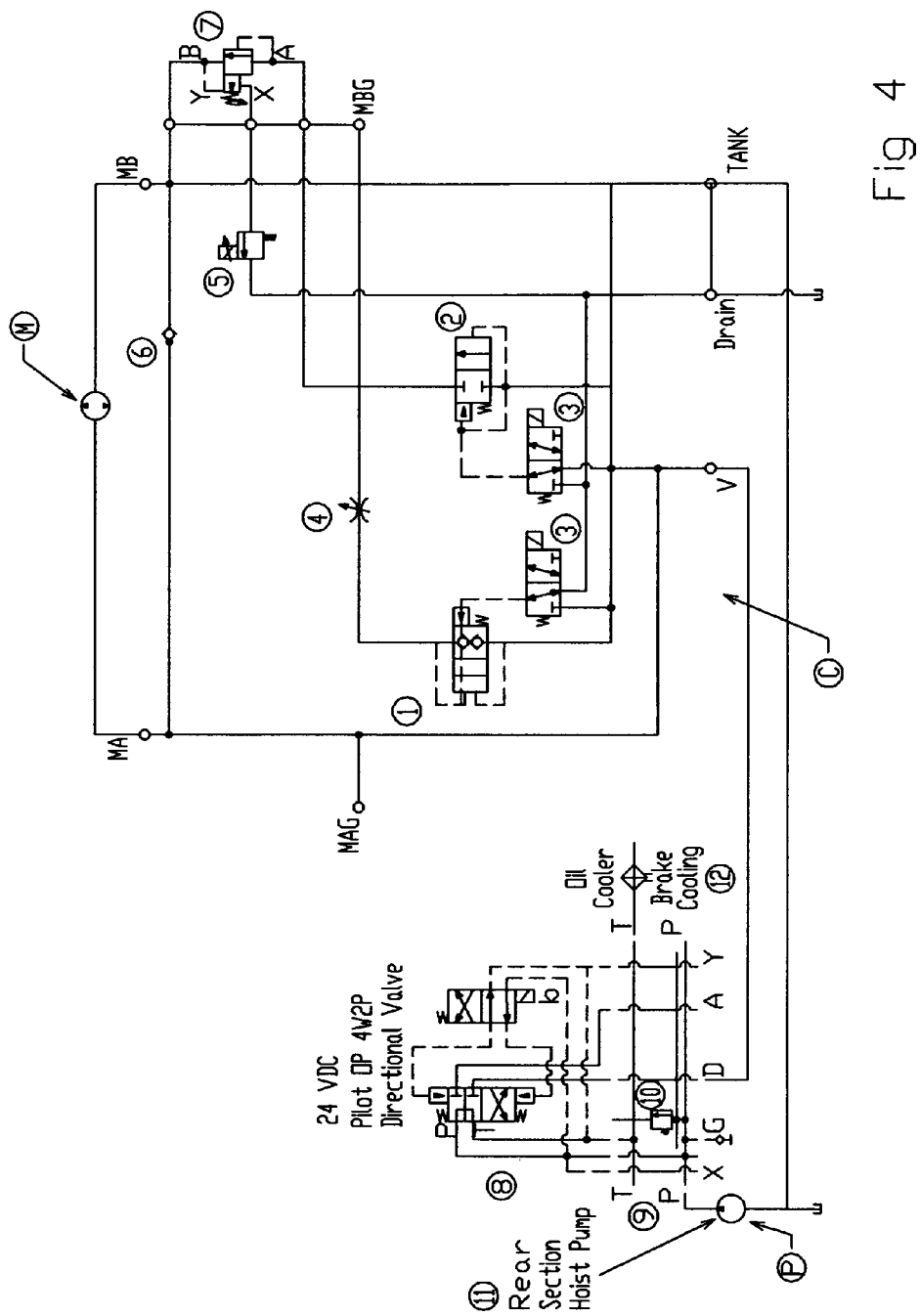
FIG. 4 illustrates a hydraulic schematic in accordance with an embodiment of the present invention.

Referring again to FIG. 1, a vehicle engine 13 is utilized to drive a hydraulic pump 14, which can be shaft driven. A reservoir or tank 16 is used for storing hydraulic fluid. Hydraulic fluid is pumped to a diverter valve 12 which can either allow hydraulic fluid to pass or can divert the hydraulic fluid back toward the tank 16. The diverter valve 12 is controllable by the PLC 4 which is located in the operator station 1. The system my also include a manually operated flow control valve 19. Hydraulic fluid passing through the diverter 12 and flow control valves 19 (hereinafter the combination of the diverter valve 12 and the flow control value 19 will be referred to simply as the flow control valve 12) are received at a variable speed hydraulic motor 11. The flow of hydraulic fluid turns the motor 11, with more flow the motor 11 speed increases and with less flow the motor 11 decreases. After propelling the motor 11, the hydraulic fluid is re-circulated back to the hydraulic tank. A schematic of an exemplary hydraulic system for enabling the presently described system is illustrated in FIG. 4. The hydraulic motor 11 is coupled to a fluid pump 10 and is for driving the fluid pump 10. The fluid pump 10 pumps fluid (in one embodiment the fluid is water) from a reservoir 18 to the plurality of spray heads E1-E4 (which are preferably mounted to the rear portion of the vehicle). The fluid pump 10 pumps an amount of fluid proportional to the speed of the hydraulic motor 11.

The system further includes a ground speed sensor device 8 in communication with the PLC 4. The ground speed of the vehicle is sensed and a signal, electrical, mechanical, or hydraulic, which is representative of the ground speed, is generated and used to inform the PLC 4, and responsive thereto the PLC 4 can, for example, actuate the control valve 12 associated with a variable speed hydraulic motor which drives the delivery means to effect fluid application control. Thus, the PLC 4 using the most recent input information to calculate the amount of hydraulic flow that is needed to drive the hydraulic motor 11 at a speed which will effectuate the desired applied water density, and then enables this particular amount of hydraulic flow by adjusting the hydraulic flow control valve 12. In a preferred embodiment, the ground speed sensor 8 is a switch means operable to provide an electrical signal directly related to the ground speed of the vehicle. Other types of ground speed sensors having an output signal proportional to the ground speed of the vehicle can be used to provide ground speed information, such as sensors that generate mechanical or hydraulic signals for example.

From the operator station 1, an operator uses a touch screen 3 to select density and/or intervals which in turn registers in the PLC 4. Touchscreens are displays which have the ability to detect the location of touches within the display area. This allows the display to be used as an input device, replacing the keyboard and/or the mouse as the primary input device for interacting with the display's content. From the operator station 1, the spray heads E1-E4 desired for delivery can also be selected on the touch screen 3 for actuation by the PLC 4. Any combination of spray heads selected is sent to the PLC 4 which in turn activates, or deactivates the system air pressure valves F1-F4 15 to allow the spray heads E1-E4 to be turned on or off. For example, the air valves 15 are controlled by a plurality of actuators which act, when energized or de-energized, to send pressure to the spray heads E1-E4. The air valves 15 are turned on or off by respective ones of the four shown rocker switches. These rocker switches can be physically disposed within the operator station 1.

Figure 5:
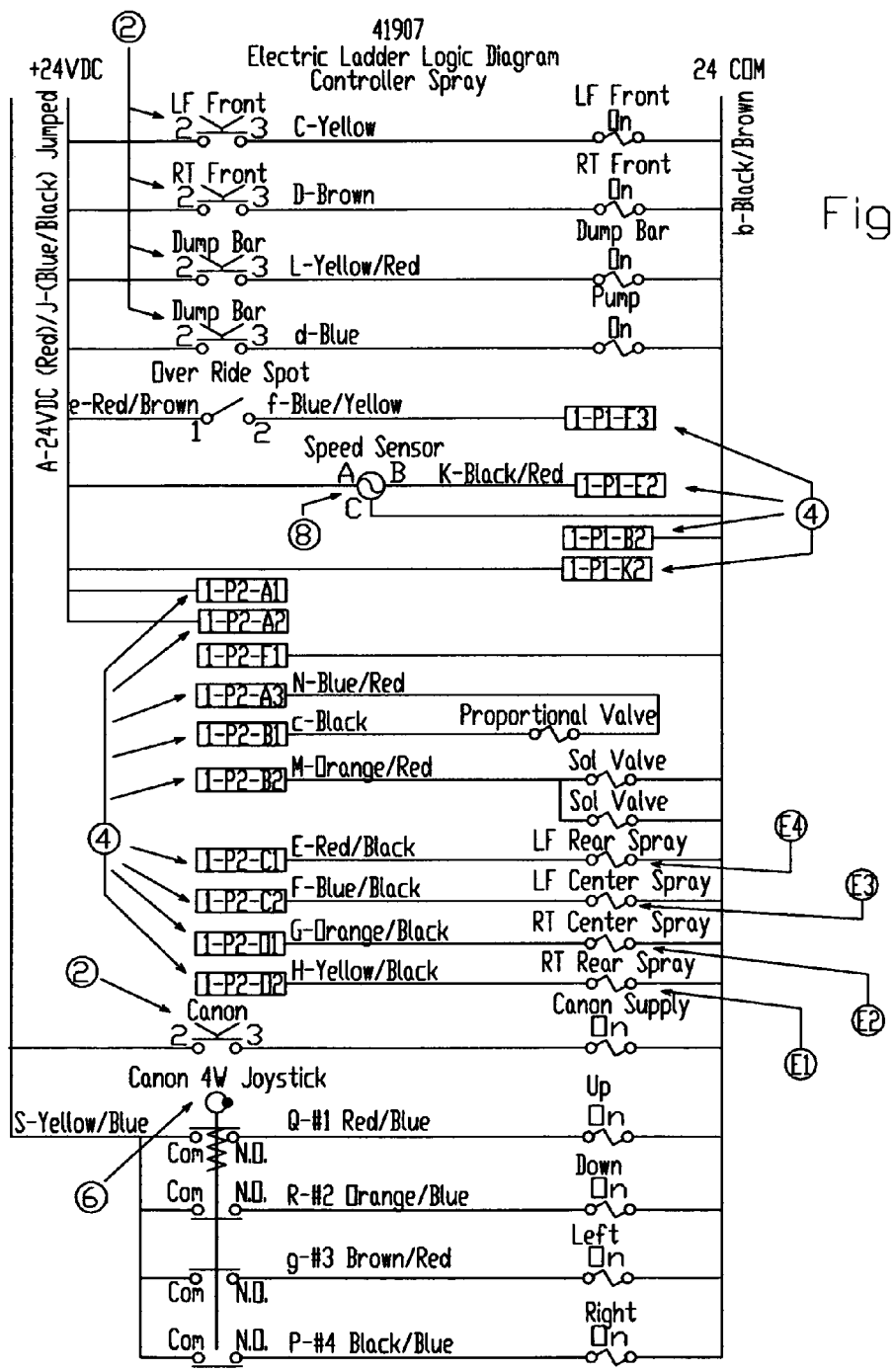
FIG. 5 illustrates an electrical ladder logic schematic in accordance with an embodiment of the present invention.

A rocker type master power switch can also be included inside or outside the operator station 1 and is for providing electricity to system components. In this embodiment, when the switch is placed in the on position, 24 volts power is supplied to the components. The row of four rocker switches are used in this example to provide electrical control of other functions, such as the shown air pressure system coupled to the spray heads (E1-E4). A system replaceable fuse can also be included and can be located in the front of the operator station 1 for easy access. The electrical requirements of the present invention are small and may be supplied either from the electric supply of the delivery vehicle or from separate batteries or both. An exemplary electrical diagram which can be used for the present invention is shown in FIG. 5. The diagram of FIG. 5 includes the above-mentioned five rocker switches 2, the vehicle speed sensor 8, inputs/outputs of the PLC 4, and a joy stick interface 6.

An additional feature of the presently described system is that from the operator station 1 an intermittent delivery option can be effectuated. The intermittent delivery option is controlled via the PLC 4 activating, or deactivating, spray heads E1-E4 at defined intervals selected by the operator on the touch screen 3. Delivery intervals are set by the operator selecting a desired distance, preferably in linear feet traveled by the vehicle. The PLC 4 then regulates the spray on off distance responsive to a received signal from a ground speed sensor 8 which can detect and signal both speed and distance traveled.

Figure 2:
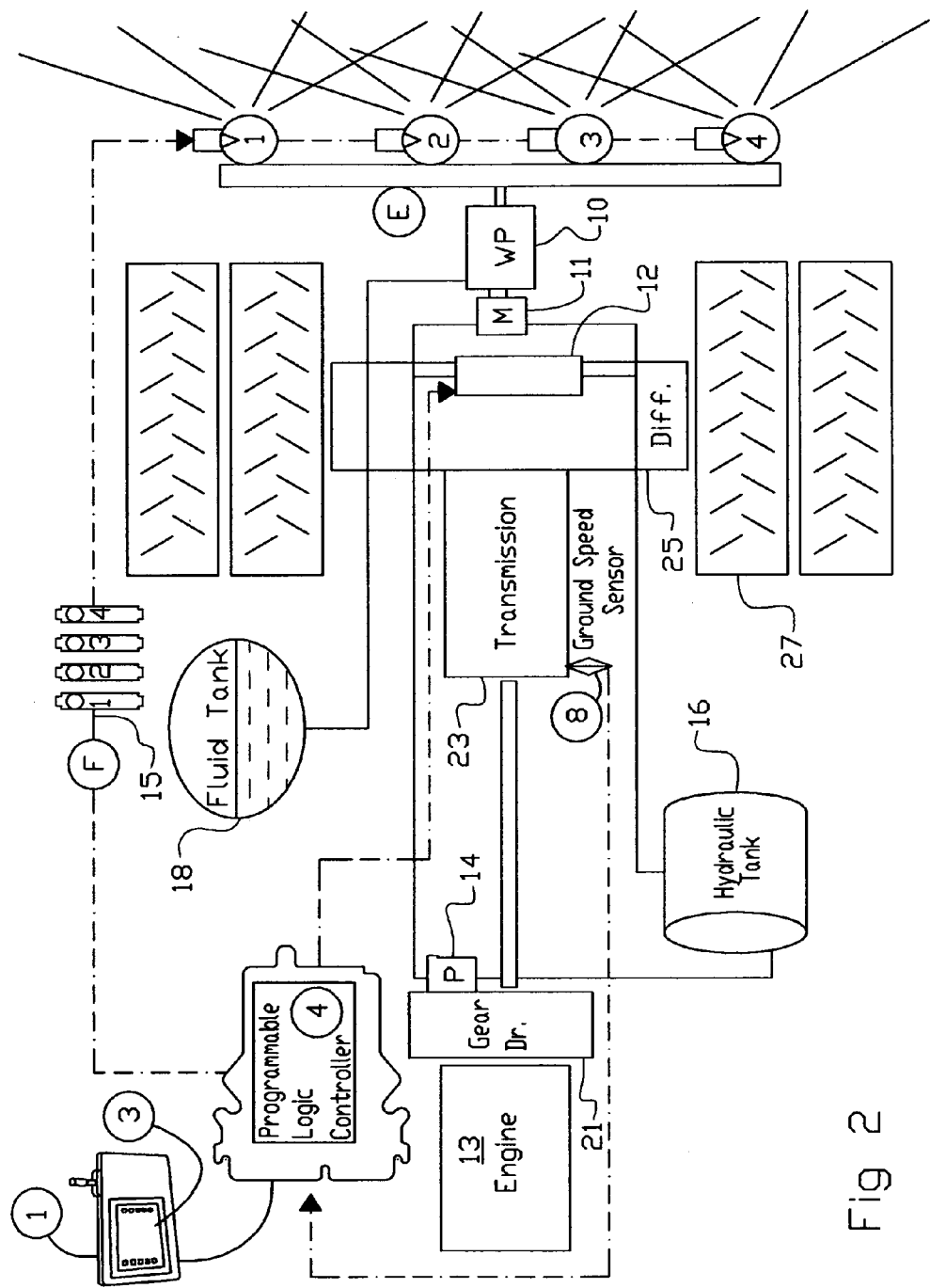
FIG. 2 illustrates a graphical display of components in accordance with an embodiment of the present invention.

Now referring to FIG. 2, there is illustrated graphical display of components in accordance with an embodiment of the present invention. More specifically, FIG. 2 is a graphical display of the fluid delivery components in relation components of a conventional water truck. In this particular example, a 33,000 gallon water tank 18 is shown and used on a 375,000 gvw truck powered by a 1,300 hp engine 13. Of course, other combinations of tank sizes and truck sizes/hp can be used. As with most conventional vehicles, the engine 13 is coupled to a gear drive 21. In the presently described system, the gear drive 21 not only drives the transmission 23 of the delivery vehicle but is also used to the drive the hydraulic pump 14 of the fluid delivery system. Further, the transmission 23 drives a differential 25 which then drives the trucks rear tires 27. This particular embodiment illustrates the spray heads E1-E4 mounted to at the rear of the delivery vehicle but it should be understood that they could be mounted on the side, front, underneath, top, or any combination thereof. Further with reference to the vehicle components, the location of the flow control valve 12, hydraulic motor 11, and fluid pump 10 is of no particular importance. For the ground speed sensor 8, it can be located based on the type of sensor used. For example, if the ground speed sensor 8 is a type made operational by the transmission 23, then it would preferably be located near the transmission 23. In another example, if the ground sensor 8 is a type made operational by the differential or tire rotation then it would preferably be located near to them. However, it is preferable that the operator station 1 be located within the cab (not shown) of the delivery vehicle so that the vehicle operator can easily make fluid delivery selections and modifications without having to leave the cab.

Figure 3:
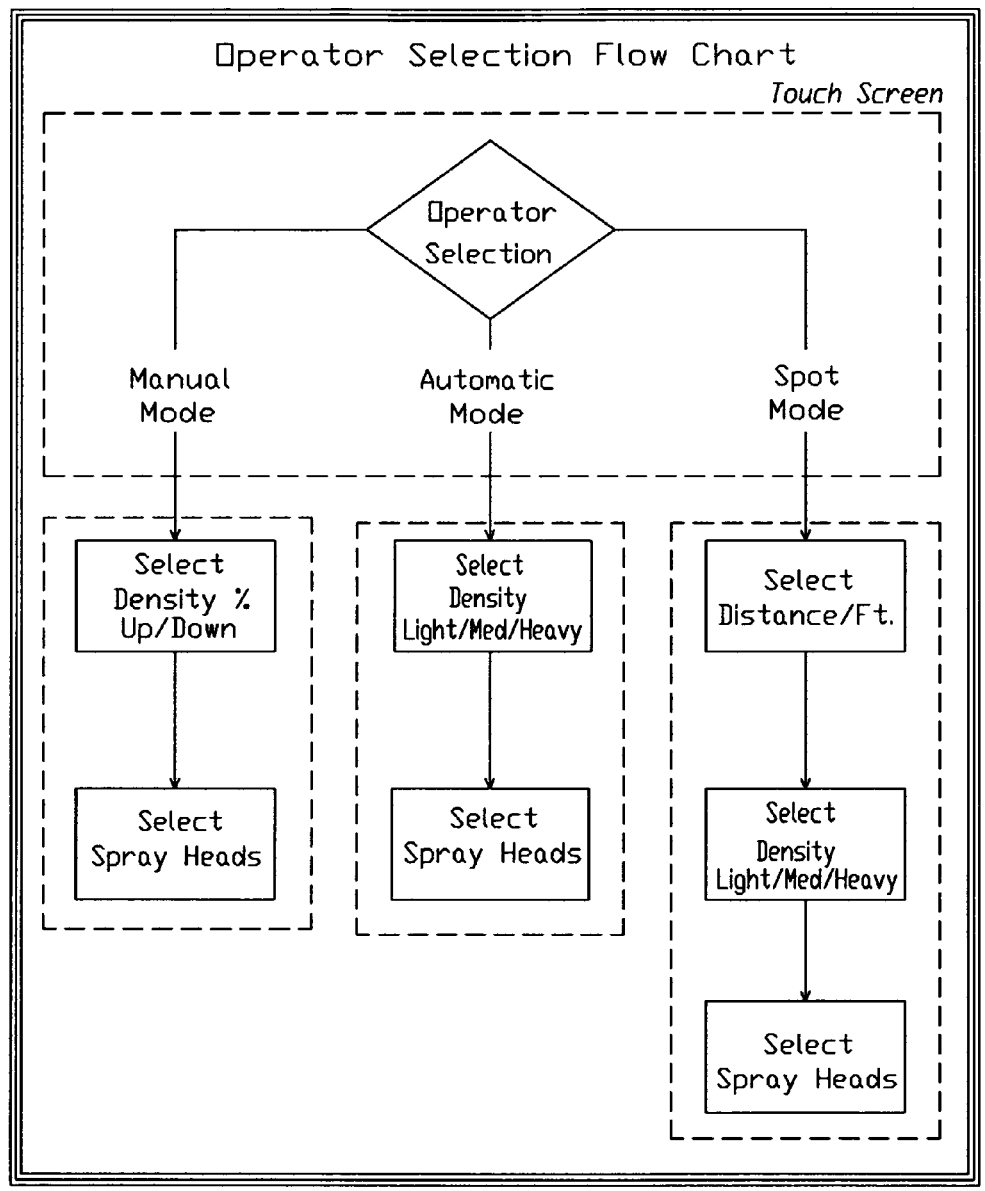
FIG. 3 illustrates a flow chart depicting selected operations via the touch screen in accordance with an embodiment of the present invention.
Figure 6:
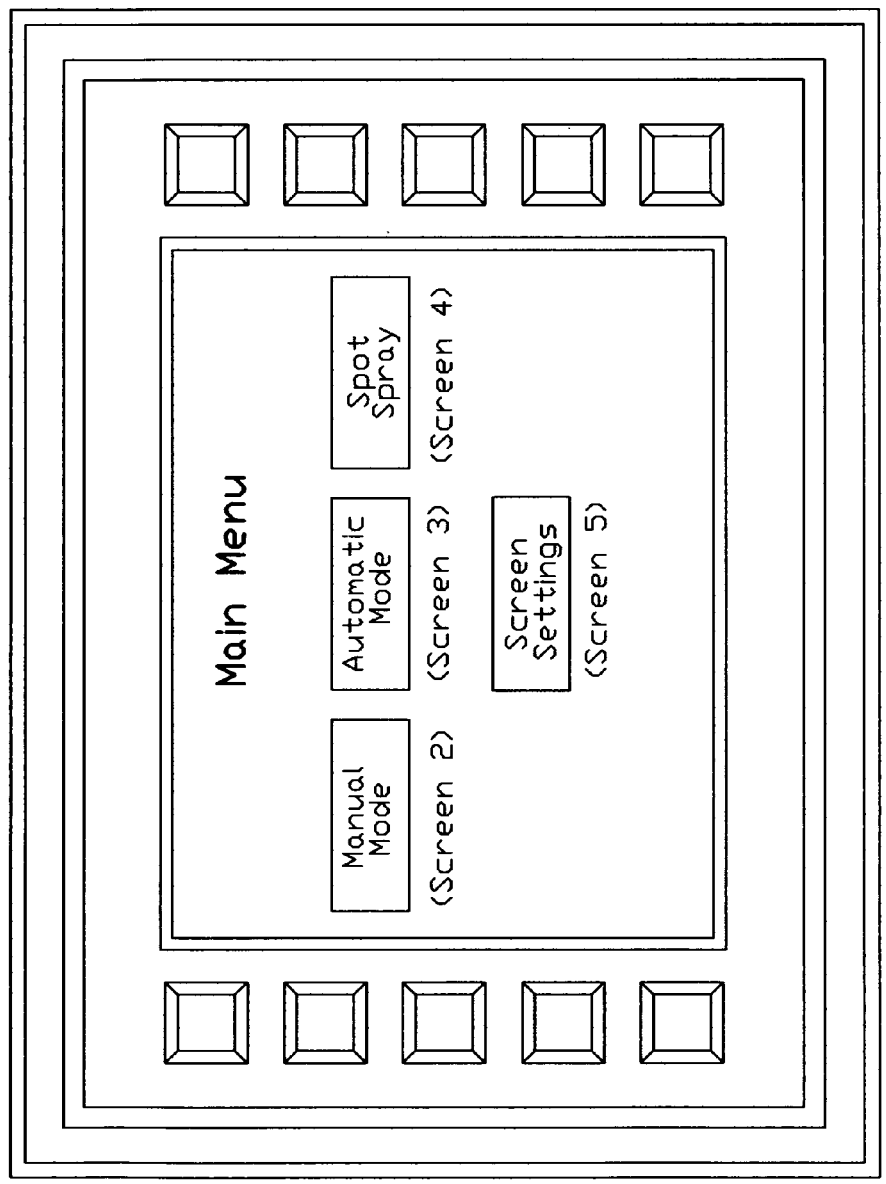
FIGS. 6-9 illustrate screen shots of the touch screen in accordance with an embodiment of the present invention.

Now referring to FIG. 3, there is illustrated a flow chart depicting operations selectable via the touch screen 3 in accordance with an embodiment of the present invention. From a main menu of the touch screen (see FIG. 6 screen shot) there are three basic operational selections: manual mode, automatic mode, and spot spray. When a specific function of "Manual", "Automatic", or "Spot" is selected, the operator is then presented with another screen to further define the options that may be selected for the desired fluid output.

Figure 7:
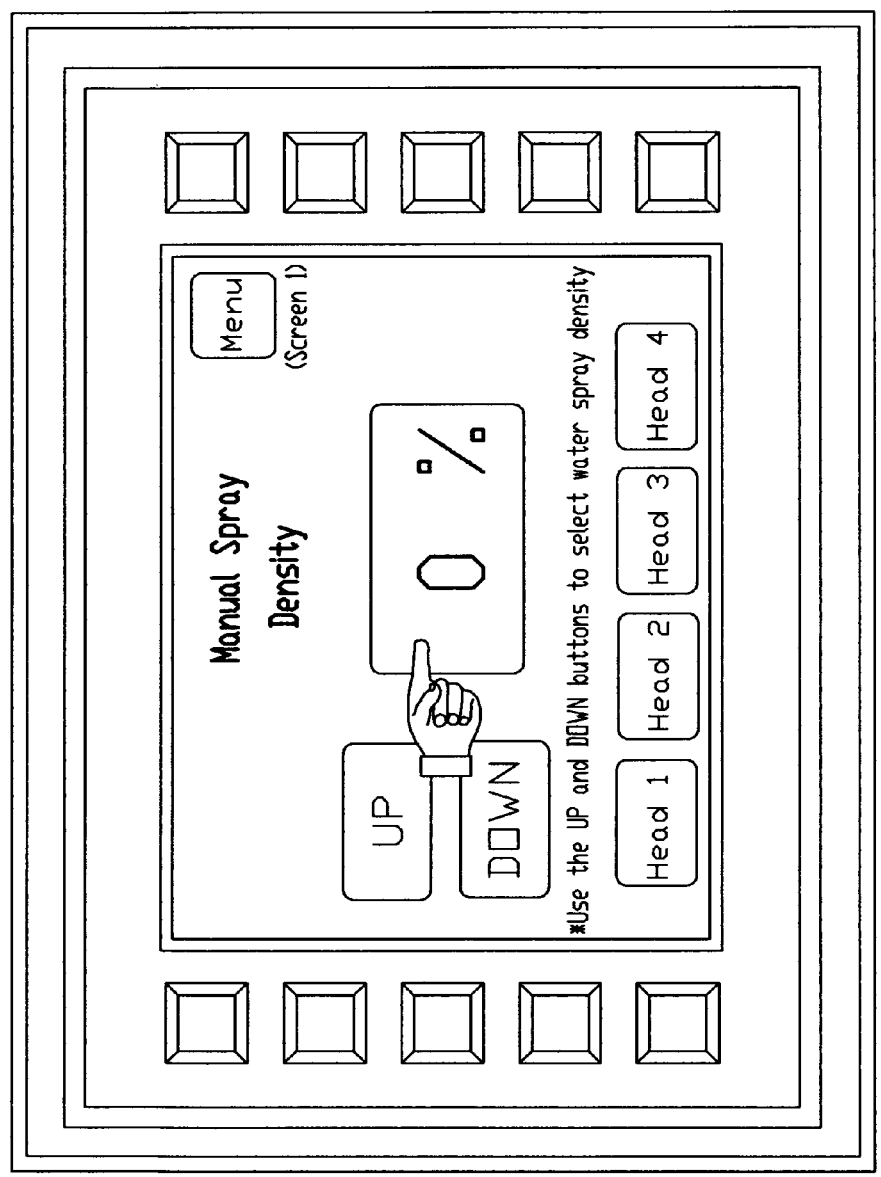

When a Manual selection is made, a further screen is presented to the operator, where the further screen allows an operator to select a spray density to be applied. Preferably, the spray density is selected as a percentage of the system flow maximum, where the maximum is determined by the maximum capabilities of system components. From this further screen, the operator is also allowed to select the particular spray heads E1-E4 to be operable during application (a Manual selection screen shot is shown in FIG. 7).

Figure 8B:
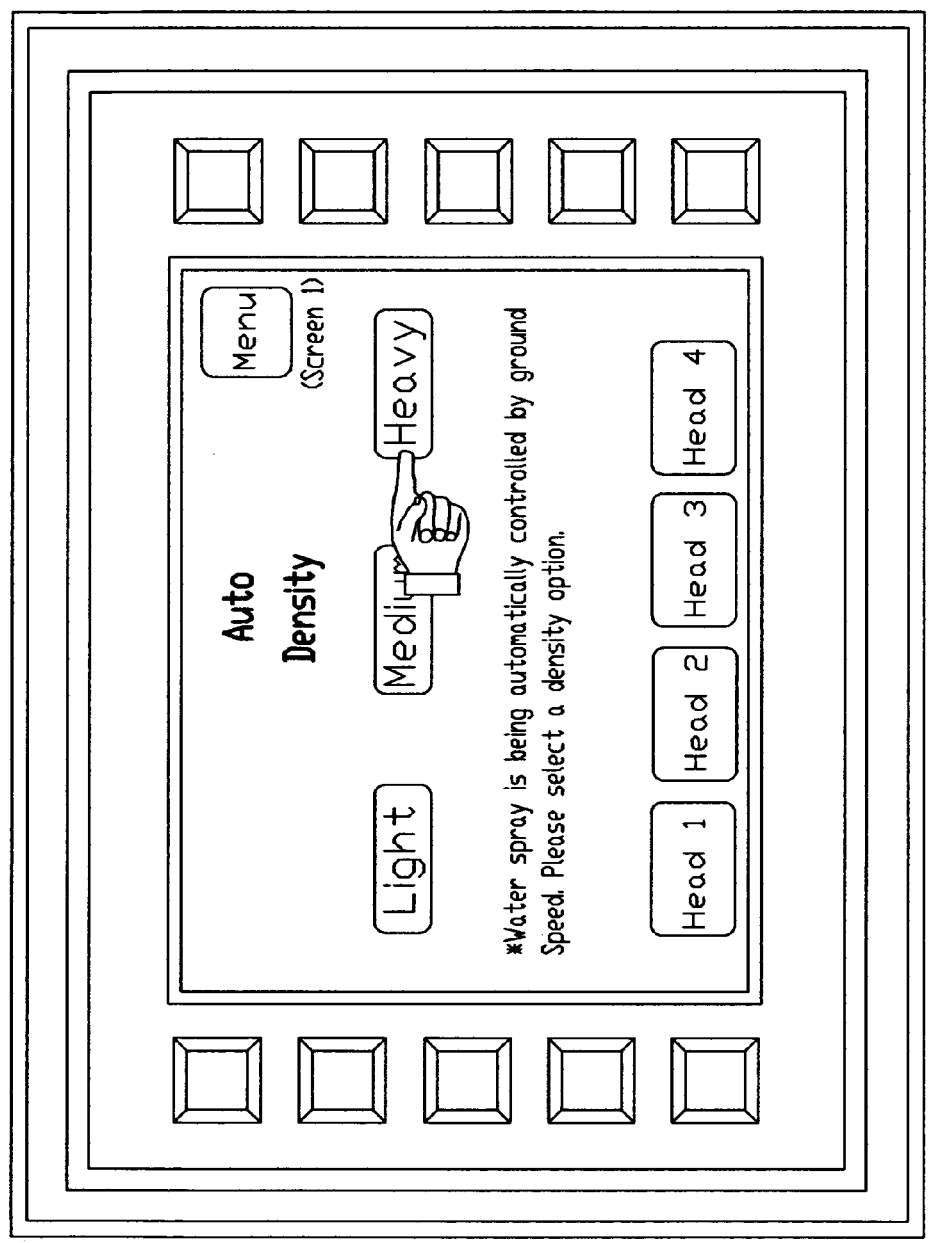

Additionally, the operator can select to have the spray automatically control. When an automatic selection is made, a further screen is presented to enable the operator to select from predefined density options (see screen shots illustrated in FIGS. 8A and 8B). In the illustrated example, the density options are light, medium, and heavy. These options can coincide with densities needed to meet particular EPA guidelines required for dust control in the open pit mining industry. Although three selections are shown, it is contemplated that any number of selections may be provided. In the Automatic mode, the spray is automatically controlled by the PLC 4 in relation to the ground speed of the delivery vehicle, as above-described From this further screen, the operator is also allowed to select the particular spray heads E1-E4 to be operable during application.

Figure 9A:
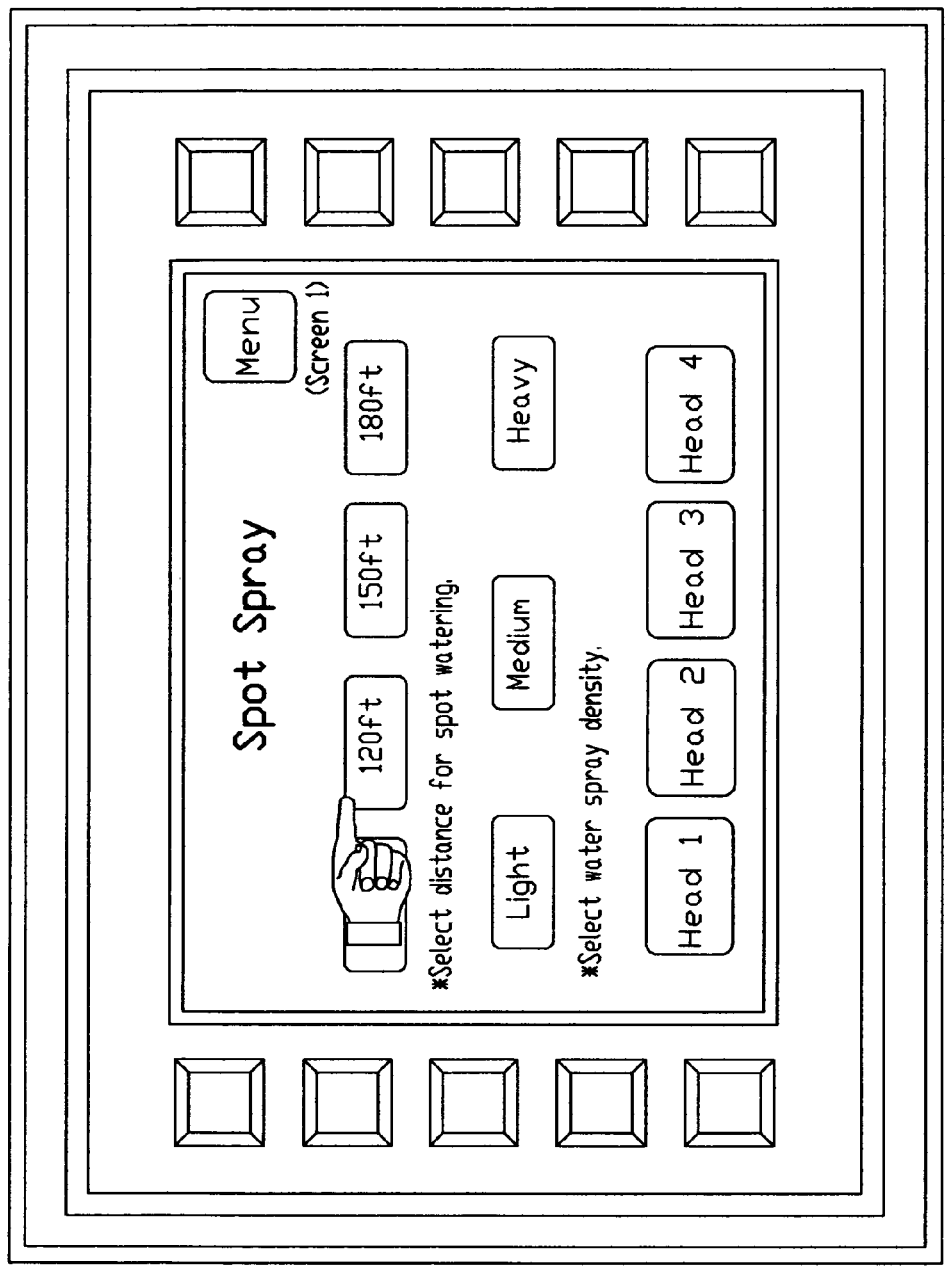
Figure 9B:
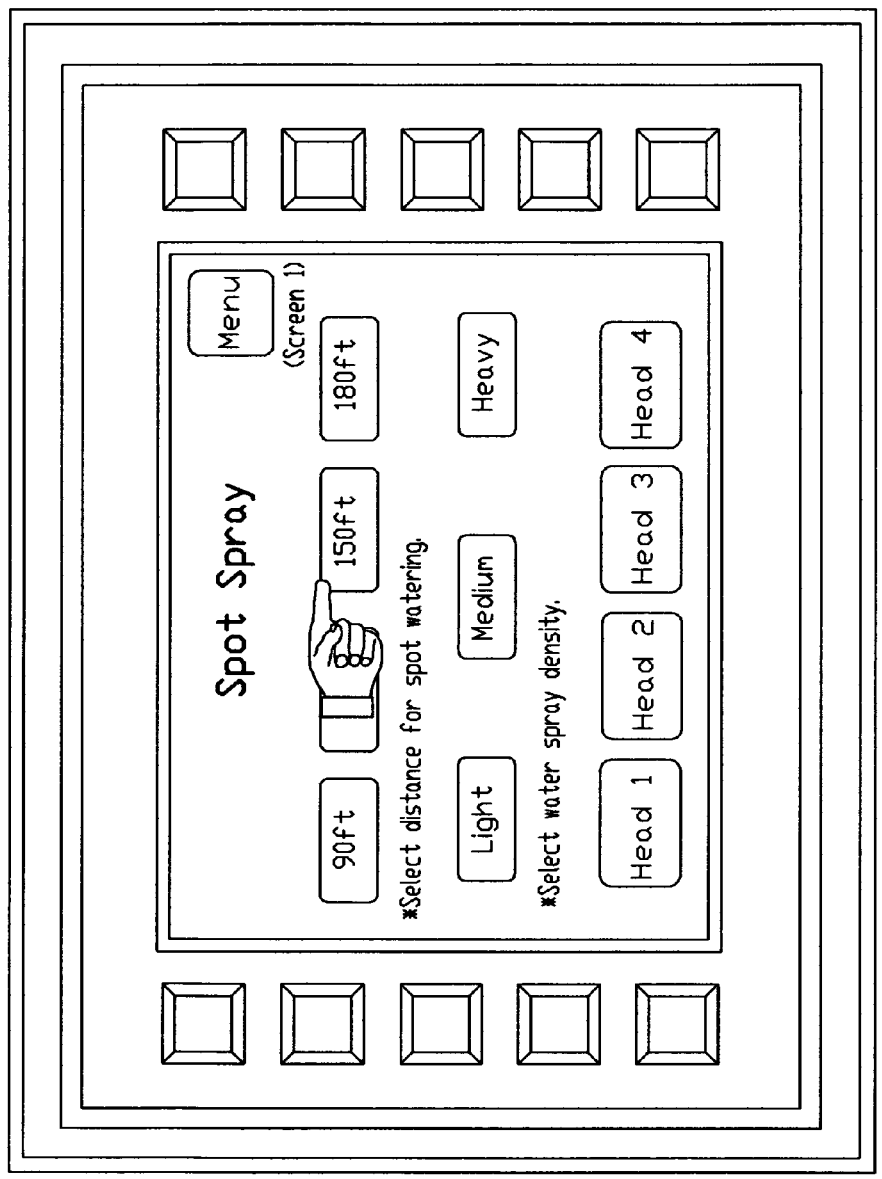

The last illustrated operator selection mode is the Spot mode. When a Spot mode selection is made, a further screen is presented to enable the operator to select from predefined intervals (here, the intervals are given in feet) for intermittent application. In addition to interval selection, the operator is allowed to select from predefined density options. In the illustrated example, the density options are light, medium, and heavy. As mentioned in the above-described Automatic mode, the options can coincide with densities needed to meet particular EPA guidelines required for dust control in the open pit mining industry. Although three selections are shown, it is contemplated that any number of selections may be provided. In the spot mode, the spray is automatically controlled by the PLC 4 in relation to the distance traveled by the delivery vehicle. From this further screen, the operator is also allowed to select the particular spray heads E1-E4 to be operable during application. Screen shots for the Spot mode are illustrated in FIGS. 9A and 9B.

Embodiments of the present invention particularly useful in the open pit mining industry where water is applied to mine roads to control dust released into the atmosphere, a condition which is regulated by Environmental Protection Agencies, both state and federal. To summarize, in at least one embodiment, the presently described system utilizes a dedicated programmable logic controller (PLC) 4 that has been programmed to: 1) interpret ground speed of a vehicle; and responsive thereto 2) control the density of fluid being applied for effectuating an evenly applied density over a wide range of vehicle speeds. That is, a control program, incorporated to be executed by the PLC 4, functions to control the flow of hydraulic fluid and thus the operation of the hydraulic motor 11 driving the fluid pump 10 to achieve the desired spraying conditions. For example, a detected increase in the ground speed causes the properly programmed PLC 4 to actuate the flow control valve 12 to proportionally increase hydraulic flow to the hydraulic motor 11 which in turn increases the speed of the fluid pump 10 leading to an increase in fluid flow to the spray heads E1-E4 for effectuating an even flow of water over the road surface despite the increase in vehicle speed.

In a further summary, at least one embodiment of the presently described system utilizes a dedicated programmable logic controller (PLC) 4 that has been programmed to: 1) interpret distance traveled by a vehicle; and 2) intermittently control the delivery of a selected density of fluid, where the selection of density and delivery intervals are executed by using touch screen technology. Delivery intervals are set by the operator selecting a desired distance, preferably in linear feet traveled by the vehicle. That is, a control program, incorporated to be executed by the PLC 4, functions to control the selected density and intermittent delivery of fluid by activating, or deactivating selected spray heads at defined intervals in response to a received signal from the ground speed sensor 8, where the received signal includes information indicative of the a distance traveled by the delivery vehicle. In this embodiment, the ground speed sensor 8 is capable of detecting both speed and distance traveled, and incorporating this information into an signal which can be interpreted by the PLC 4.

Although preferred embodiments of the system and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A fluid application delivery system including a vehicle, multiple fluid applicators mounted thereto and a fluid conduit supplying fluid to said applicators from a reservoir, the system for applying a fluid to road surfaces used in open pit mining sites as required by the Environmental Protection Agency for controlling an amount of dust released to the atmosphere, the system comprising:

a hydraulic pump driven by the engine of the vehicle;

a hydraulic motor driven by the flow of hydraulic fluid provided thereto, wherein the speed of the motor is proportional to the flow of the applied hydraulic fluid;

a hydraulic valve coupled between the hydraulic pump and the hydraulic motor for controlling the flow of hydraulic fluid to the hydraulic motor;

a fluid application pump driven by the hydraulic motor and for providing the fluid to be applied to the road surface to the fluid applicators, wherein an amount of application fluid pumped by the fluid application pump is proportional to the speed of the hydraulic motor;

a speed sensor for detecting the speed of the vehicle and for generating a signal indicative of the detected speed; and a control apparatus having a control coupling to the hydraulic valve and the multiple fluid applicators for controlling the application of the fluid to the road surface and located within the area for which the vehicle is controlled, the apparatus comprising;

a programmable logic controller having an input for receiving the detected speed signal, and responsive thereto controlling the speed of the hydraulic motor via the flow from the hydraulic valve for enabling a controlled amount of application fluid to be provided to the multiple fluid applicators in relation to the detected vehicle speed; and a touch screen graphical user interface in communication with the logic controller for enabling a user to select from a plurality of programmed responses provided by the logic controller, wherein each one of the selections enables a different controlled amount of application fluid to be applied to the road surface.

2. The fluid application delivery system of claim 1 wherein the amount of application fluid provided is independent of the rpm of the vehicle motor.

3. The fluid application delivery system of claim 1 wherein at least one of the programmed responses enables an intermittent (or spot spray) in which the application fluid is controlled to apply the application fluid at defined intervals selected by the user.

4. The fluid application delivery system of claim 1 wherein the programmed responses include a light application density, a medium application density, and a heavy application density each being a percentage of maximum application density determined by the design limits of the delivery system.

5. The fluid application delivery system of claim 4 wherein at least one of the programmed responses enables an intermittent (or spot spray) in which the application fluid is controlled to apply the application fluid at defined intervals selected by the user, and wherein the programmed responses also include a light application density, a medium application density, and a heavy application density each being a percentage of maximum application, and wherein at least one of the programmed responses enables a manual entry of a percentage of maximum application density.

6. The fluid application delivery system of claim 1 wherein at least one of the programmed responses enables a manual entry of a percentage of maximum application density, where the maximum is determined by the design limits of the delivery system.

7. A fluid application system for applying a sprayed fluid from a delivery vehicle to a surface, comprising:

a fluid pump for providing the fluid to a plurality of spray heads, where the fluid is stored in a reservoir and provides the fluid to the fluid pump;

a motor connected to the fluid pump for driving the fluid pump, wherein an amount of fluid pumped by the fluid pump is proportional to the speed of the motor;

a speed sensor for detecting the speed of the delivery vehicle and for generating a signal indicative of the detected speed; and a control apparatus having a control coupling to the motor and the spray heads, the apparatus comprising;

a programmable logic controller having an input for receiving the detected speed signal, and responsive thereto for controlling the speed of the motor and on/off operation of the spray heads for enabling a controlled amount of fluid to be applied to a delivery surface in relation to the detected vehicle speed; and a touch screen graphical user interface in communication with the logic controller for enabling an user to select from a plurality of programmed responses provided by the logic controller, wherein each one of the selections enables a different controlled amount of fluid to be applied to the delivery surface;

a hydraulic pump which is driven by the engine of the vehicle, and wherein the motor is a hydraulic motor driven by the flow of hydraulic fluid provided thereto, wherein the speed of the motor is proportional to the flow of the applied hydraulic fluid;

a hydraulic valve coupled between the hydraulic pump and the hydraulic motor for controlling the flow of hydraulic fluid to the hydraulic motor, wherein the fluid pump is driven by the hydraulic motor, and wherein an amount of application fluid pumped by the fluid pump is proportional to the speed of the hydraulic motor.

* * * * *